July 28, 1936.  C. N. BEBINGER  2,049,346
SPRING DRIVE FOR SHAKING CONVEYERS
Filed Aug. 22, 1935   2 Sheets-Sheet 1
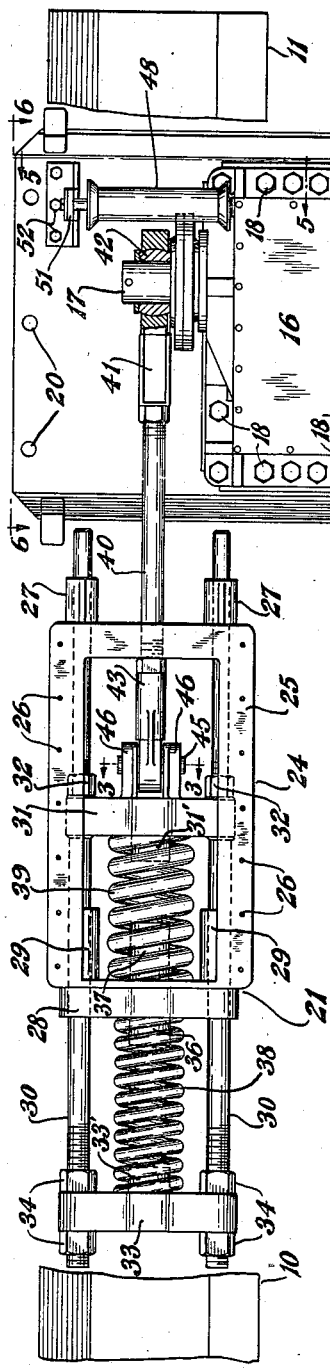
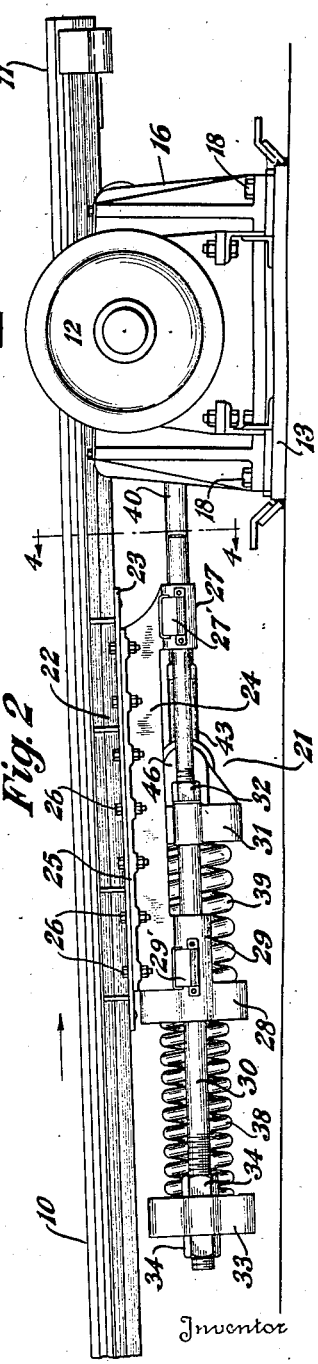
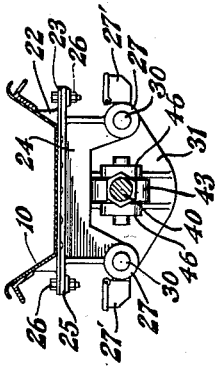
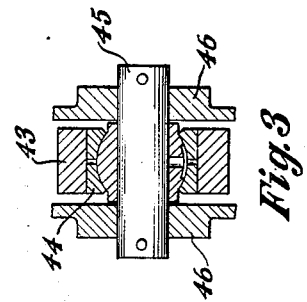
Inventor
C. N. Bebinger
By Frease and Bishop
Attorneys July 28, 1936.  C. N. BEBINGER  2,049,346
SPRING DRIVE FOR SHAKING CONVEYERS
Filed Aug. 22, 1935   2 Sheets-Sheet 2

Inventor
C. N. Bebinger
By Frease and Bishop
Attorneys

Patented July 28, 1936

2,049,346

UNITED STATES PATENT OFFICE 2,049,346

SPRING DRIVE FOR SHAKING CONVEYERS

Charles N. Bebinger, New Philadelphia, Ohio, assignor to La-Del Conveyor & Mfg. Co., New Philadelphia, Ohio, a corporation of Ohio Application August 22, 1935, Serial No. 37,356

5 Claims. (Cl. 198—220)

The invention relates generally to shaking conveyers, and more particularly to a spring drive construction for shaking conveyers, which are especially adapted for conveying coal and the like in a mine.

Such shaking conveyers are required to have a reciprocating movement which is slow and gradual during the forward stroke so as to advance the material carried thereby, and which is relatively sudden and rapid during the rearward stroke so that the material will remain in its advanced position due to its inertia.

It is desirable to provide spring means or other yieldable means for cushioning the shock of the conveyer load when the motion of the conveyer changes, and for further protecting the driving connections in the event the conveyer becomes jammed or wedged for any reason.

I am aware that certain prior constructions have included a yieldable driving connection pivotally mounted on a driving crank, for transmitting the motion of the crank to the drive trough section of the conveyer, through a connecting rod.

I have found from actual experience that this prior type of construction has many serious disadvantages and causes much difficulty in operation, so as to substantially prohibit its use, from a practical and economical standpoint.

For example, where the yieldable driving connection is pivotally mounted on the driving crank, the height of the conveyer drive trough must be sufficient to take care of the vertical motion of the whole driving connection as the crank rotates, and the angularity of the connecting rod and drive trough requires a relatively long drive trough to make the connection with the main conveyer at its relatively low elevation. In a mine, it is very important to keep the conveyer trough as low as possible because of the lack of overhead clearance and to use a short drive trough to facilitate installation and handling.

Moreover, the vertical motion of the driving connection or unit, due to rotation of the crank, tends to cause vertical or tossing motion in the conveyer drive trough, which detracts from the effective longitudinal conveying action, and also renders it more difficult to maintain the drive trough in alignment. The longer the conveyer the more this tossing action is accentuated because of the heavier conveyer load.

Mounting the drive unit directly on the crank imposes a heavy load thereon, with the result that the driving mechanism must be made extremely strong and heavy, and excessive driving power is required to produce the desired conveying action.

Accordingly, it is an object of the present invention to provide a spring drive for transmitting reciprocating motion from the driving crank to the conveyer drive trough, which drive may be located directly under the drive trough and still permit the drive trough to be carried at a minimum height above the driving crank.

Another object is to provide a spring drive which transmits the motion of the driving crank to the drive trough to longitudinally reciprocate the same with a minimum of vertical or tossing motion for light or heavy conveyer loads.

Another object is to provide a spring drive for a shaking conveyer which does not impose additional load on the driving crank, and which produces a conveying action of maximum effectiveness with a minimum of driving power.

In prior constructions wherein the driving unit includes shock absorbing springs and is carried directly on the crank, it is very difficult to adjust the tension in the springs when the conveyer is being reciprocated due to the rotary motion of the crank and of the whole drive unit carried thereby; and since the tension of the springs must be adjusted for each different conveyer load, proper adjustment can only be reached by continued trial.

Furthermore, when the drive unit is carried directly on the crank, it is practically impossible to obtain a good longitudinal conveying action for light conveyer loads, due to the fact that the rotary movement of the drive unit detracts from the effectiveness of the longitudinal conveying action.

Also, where the whole drive unit rotates with the crank, the danger factor is extremely high because centrifugal force would tend to throw out a broken spring or other part and cause serious damage or injury.

It is therefore a further object of the present invention to provide a spring drive construction which can be easily adjusted for any conveyer load while the conveyer is in motion.

Another object of the present invention is to provide a spring drive for shaking conveyers which will produce good conveying action for light conveyer loads as well as heavy ones.

A further object is to provide a spring drive for shaking conveyers which will be relatively safe in operation regardless of breakage of any of its parts.

Another object is to provide a drive construction having springs for absorbing the shocks due to change of motion of the conveyer load, which springs at the same time impart the slow forward movement and rapid rearward movement to the conveyer.

A still further object is to provide a spring drive construction for a shaking conveyer, which permits maintaining the conveyer drive trough in accurate alignment during reciprocation, and which may be economically constructed, installed and operated.

And finally, it is an object of the present invention to overcome substantially all of the disadvantages and difficulties of prior constructions, and to generally improve the art.

These and other objects are accomplished by the improvements, arrangements and combinations comprising the present invention, which is hereinafter described in detail and defined in the appended claims.

In general terms the present invention includes a spring drive carried directly on a conveyer drive trough which is located over a driving crank, said spring drive including springs of unequal strength for imparting a gradual forward longitudinal movement and a sudden rearward longitudinal movement to the drive trough, and a connecting rod operatively connecting the spring drive to the driving crank.

In the drawings forming part hereof

Figure 1 is a plan view of the improved spring drive connected to the drive trough of a shaking conveyer, parts being broken away to better illustrate the driving mechanism;

Fig. 2 is a side elevation thereof;

Fig. 3 is a fragmentary sectional view as on line 3—3, Fig. 1;

Fig. 4 is a transverse sectional view as on line 4—4, Fig. 2;

Similar numerals refer to similar parts throughout the drawings.

Figure 5:
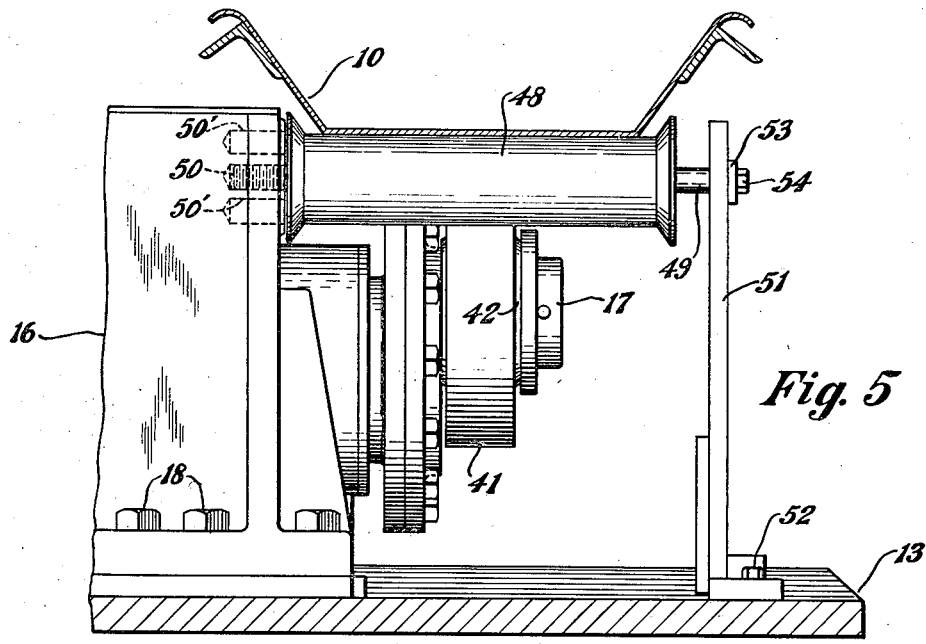
Fig. 5 is a fragmentary sectional view as on line 5—5, Fig. 1.
Figure 6:
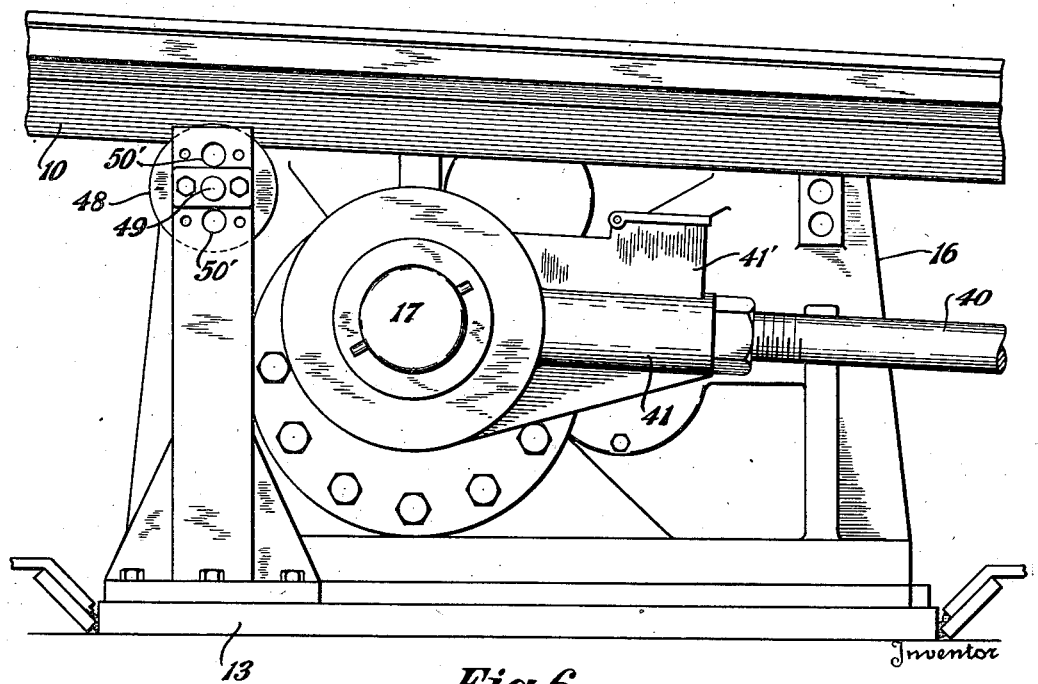
Fig. 6 is a fragmentary elevation as on line 6—6, Fig. 1.

The drive trough section of a shaking conveyer is indicated at 10, and the delivery end thereof is indicated at 11, so that the movement of the material on the conveyer is in the direction of the arrow in Fig. 2.

The power driving mechanism for reciprocating the conveyer preferably includes an electric motor 12 supported at one end of a base 13 which preferably extends transversely under the drive trough 10. The motor shaft 14 may have a flywheel 15 thereon and extends into a gear box 16 for connection with suitable reduction gearing housed in said gear box, for driving the crank 17 extending from the opposite side of the gear box at the required speed.

The gear box 16 is supported upon the base 13 as by cap screws 18, in a usual manner, and the base is positioned transversely of the drive trough so as to bring the crank 17 directly under the longitudinal axis of the conveyer.

The base preferably includes a heavy base plate having spaced holes or depressions 20 therein for receiving jacks to support the safe from the ceiling of a mine and the like.

The improved spring drive unit is indicated generally at 21, and is rigidly secured to the drive trough 11 preferably a short distance from the base 13 in a direction longitudinally of the conveyer. The drive trough may have a cast mounting structure 22 rigidly secured to a drive trough provided with a flange 23 to which the spring drive unit is secured. The spring drive unit preferably includes a frame 24 having at its upper side a flange 25 which abuts the flange 23 and is secured thereto by means of bolts 26.

The frame 24 is preferably provided at the end adjacent the base 13 with depending portions forming laterally spaced longitudinal guides 27, and at its oposite end the frame 24 is provided with a depending thrust abutment 28 having laterally spaced longitudinal guides 29. The axes of the guides 27 and 29 coincide and are parallel to the drive trough 10.

A pair of guide rods 30 is slidably mounted in the guides 27 and 29 for longitudinal movement parallel to the drive trough 10. Between the guides 27 and 29 a spring saddle 31 is adjustably secured to the guide rods 30 by means of nuts 32 screwed on the guide rods.

A spring saddle 33 is adjustably secured to the ends of the guide rods on the opposite side of the thrust abutment 28 by means of nuts 34 screwed on the guide rods. Thus the saddles 31 and 33 are adjustably secured on the guide rods at longitudinally opposite sides of the thrust abutment 28.

Preferably, the spring saddles 31 and 33 have at their central portions coaxial spring centering bosses 31' and 33', respectively, extending toward the thrust abutment 28, and the thrust abutment 28 has at its central portion a spring centering boss 36 coaxial with and extending toward boss 33', and a spring centering boss 37 coaxial with and extending toward boss 31'.

Preferably, a relatively weak compression spring 38 is interposed between saddle 33 and thrust abutment 28 and centered on the bosses 33' and 36, and a relatively strong compression spring 39 is interposed between saddle 31 and thrust abutment 28 and centered on the bosses 31' and 37; said springs acting to oppose each other and to yieldingly transmit the longitudinal reciprocatory movement of the saddles to the conveyer.

Oil reservoirs 27' and 29' may be provided on the guides 27 and 29 respectively, for providing lubrication for the guide rods 30.

The means for operatively connecting the driving crank 17 to the spring drive unit 21 for transmitting longitudinal reciprocating movement to the conveyer preferably includes a connecting rod 40 which is pivotally connected at one end to the crank and at the other end to spring saddle 31.

Preferably, the crank end of the connecting rod 40 has a journal portion 41 which is journalled on a bushing 42 on the crank, and the bushing 42 has a spherical outer surface conforming to a spherical inner surface on journal 41 to form a self-aligning bearing. Likewise, the opposite end of the connecting rod 40 is provided with a journal portion 43 which is journalled on a spherical bushing 44, which is in turn journalled on the pivot pin 45 pivoted on the ears 46 of the spring saddle 31 (Fig. 3) to form a self-aligning bearing at that end of the connecting rod.

The journal portion 41 may be provided with an oil reservoir 41', for lubricating the self-aligning bearing on the crank 17.

Means for rollably supporting the discharge end 11 of the drive trough 10 may include a carriage roller 48 journalled on a shaft 49 which is preferably carried at one end in the housing of the gear box 16, as shown at 50. The other end of the shaft 49 passes through a bracket arm 51 which is mounted on the base 13 and secured thereto by bolts 52. Preferably, the end of shaft 49 which projects through bracket arm 51 has secured thereto a plate 53 which is bolted to the arm 51 by bolts 54, for securely holding the shaft 49 in position. Preferably, the bracket arm 51 and the gear box housing are provided with vertically spaced holes 50' for receiving the shaft 49 to support the carriage roller 48 at different elevations for adjusting the height of the drive trough 10.

Because of the fact that the spring drive unit is spaced from the crank 17 longitudinally of the conveyer, the supporting roller 48 for the drive trough may be mounted on the same base 13 as the power driving mechanism without enlarging the base. If the spring drive unit were carried on the crank, a separate support would be required for the carriage roller, or the base would have to be extended longitudinally of the conveyer to take care of the same. Since the base plate is necessarily heavy and rugged for carrying the power drive mechanism, it is extremely important from an economical and installation standpoint to keep the base to a minimum size.

In the operation of the improved apparatus, it is customary to initially adjust the spring saddles 31 and 33 so that the springs 38 and 39 are each under a small amount of compression. For a given conveyer load, this adjustment may be varied while the conveyer is reciprocating to obtain the most effective stroke for conveying the material.

As the crank 17 starts its forward revolution tending to move the spring saddle 31 to the right as viewed in Figs. 1 and 2, the rods 30 will move saddle 33 to the right until the compression of spring 38 is sufficient to move the load of the conveyer forward, or to the right. Since the spring 38 is relatively weak, the load of the conveyer will be picked up gradually, and during the last part of the forward stroke, the conveyer will move to the right without further compression of the spring.

When the crank reaches the end of its forward travel the momentum of the conveyer carries the conveyer still further to the right while the crank is starting its rearward stroke. The rearward movement of the crank combined with the forward momentum of the conveyer acts to compress the relatively strong spring 39 relatively sudden and rapidly so that the conveyer load on the rearward stroke is picked up and the movement of the conveyer reversed suddenly with a sharp bump, which serves to slide the conveyer rearwardly under the material carried thereby, and allow the material to remain in its advanced position due to its previous gradual forward movement.

Moreover, the built up energy in the strong spring 39 relieves the load on the crank during the first part of the rearward stroke, and the conveyer load is picked up before the crank passes over center, with the result that the rearward stroke of the conveyer is more rapid than the forward stroke, thus materially aiding the effectiveness of the conveyer action.

When the strong spring 39 has been expanded on the rearward stroke, and the crank reaches the end of its rearward travel, the conveyer continues to move rearwardly during the first part of the forward motion of the crank until the compression of spring 38 is sufficient to gradually pick up the conveyer load and again move the same forwardly to the right.

The present improved spring drive construction provides spring means carried directly on the conveyer for cushioning shocks due to the change of motion of the conveyer and to other causes, which spring means also acts to impart a gradual relatively slow forward movement and a sudden relatively rapid rearward movement to the conveyer.

Moreover, the improved drive provides spring means which always act in directions parallel to the movement of the conveyer, so that the maximum effectiveness of the motion of the driving crank is transmitted to the conveyer to cause it to reciprocate longitudinally.

The present improved spring drive unit is carried directly under the conveyer and permits a driving crank also to be located directly thereunder still allowing the height of the conveyer at the crank to be kept at a minimum.

The minimum height of the conveyer above the crank and the straight line movement of the driving springs enables the use of a relatively short drive trough because the difference in elevation between the main conveyer and the drive trough is relatively small.

Since the whole weight of the spring drive unit is carried on and supported by the conveyer, there is no excess load carried by the driving crank, so that a relatively light weight power driving mechanism may be employed, and a minimum of driving power is required.

The rotary motion of the crank is transmitted to the conveyer in the form of reciprocatory motion parallel to the conveyer, and the weight of the spring drive is wholly on the conveyer; so that the vertical motion or tossing effect of the crank on the conveyer is substantially eliminated, with the result that the drive trough of the conveyer may be maintained in accurate alignment, and a longitudinal conveying action of maximum effectiveness is obtained.

It is relatively easy to adjust the tension on the compression springs of the spring drive while the conveyer is in motion, since the springs and spring saddles always move longitudinally of the conveyer. Accordingly, since the springs and spring saddles have a relatively slow straight line motion, the tension of the compression springs may be easily and quickly adjusted for each conveyer load while the conveyer is reciprocating, by adjusting the position of the spring saddles on the guide rods by means of nuts 32 and 34.

Due to the fact that the springs and spring saddles always travel in straight lines parallel to the conveyer, it is possible to obtain a good conveying action for light conveyer loads, because the maximum effectiveness of the stroke is utilized.

The conveying action for light loads is also materially improved by the additional weight of the spring drive on the drive trough. This makes it possible to obtain a satisfactory conveying action for a short length of conveyer because the weight of the spring drive provides the additional momentum necessary to compress the unequal springs of the drive unit sufficiently to obtain the proper stroke.

In case of breakage of a spring, for example, in the drive unit, there is little danger of damage or injury because the moving parts of the drive unit have a straight line motion which does not tend to cause the broken parts to be thrown out, as would be the case if the springs had a rotary motion.

The fact that the improved spring drive unit is longitudinally spaced from the crank permits the use of self-aligning bearings at each end of the connecting rod to maintain the conveyer in accurate longitudinal alignment without imposing undue stress and strain upon any of the parts of the driving mechanism.

The present improved construction is economically constructed, installed and operated, and has been found in actual practice to substantially overcome all of the disadvantages and difficulties of prior constructions.

I claim:

1. Driving construction for a shaking conveyer having a drive trough, including a driving crank located under said drive trough, power drive means operatively connected to said crank, a spring drive frame rigidly mounted directly on said drive trough and having guides, a thrust abutment on the drive frame, saddles at longitudinally opposite sides of said thrust abutment, rods adjustably connecting said saddles and longitudinally slidable in said guides, a weak compression spring interposed between the thrust abutment and one of the saddles and a strong compression spring interposed between the thrust abutment and the other saddle, and a connecting rod pivotally connecting one of the saddles to the driving crank.

2. Driving construction for a shaking conveyer having a drive trough, including a driving crank located under said drive trough, power drive means operatively connected to said crank, a spring drive frame rigidly mounted directly on said drive trough and having guides, a thrust abutment on the drive frame, saddles at longitudinally opposite sides of said thrust abutment, rods adjustably connecting said saddles and longitudinally slidable in said guides, spring means interposed between the thrust abutment and said saddles, and a connecting rod pivotally connected at one end to the driving crank and at the other end to one of said saddles.

3. A spring drive for a shaking conveyer, including a frame secured to the conveyer, guide rods slidable in the frame longitudinally of the conveyer and having saddles adjustably secured thereto at opposite ends thereof, a connecting rod connected at one end to one of the saddles, power driven crank means operatively connected to the other end of the connecting rod, said frame having a portion depending between said saddles, and springs of unequal strength interposed between the saddles and said depending portion for transmitting a gradual forward movement and a sudden rearward movement to the conveyer.

4. A spring drive for a shaking conveyer, including a frame secured to the conveyer, guide rods slidable in the frame longitudinally of the conveyer and having saddles adjustably secured thereto at opposite ends thereof, power driven crank means located directly under the conveyer, a connecting rod pivotally connecting one of the saddles to said crank means, said frame having a portion depending between said saddles, and springs interposed between the saddles and said depending portion for transmitting longitudinal reciprocating movement to the conveyer.

5. Driving construction for a shaking conveyer having a drive trough, including a base extending transversely under the drive trough, a motor on the base, a gear box on the base operatively connected to said motor for driving a crank extending from said gear box under the drive trough, a roller for carrying the drive trough supported at one end on said gear box and at the other end on said base, and a spring drive unit rigidly mounted on the drive trough and operatively connected to said crank for transmitting longitudinal reciprocating motion to said drive trough.

CHARLES N. BEBINGER.